United States Patent [19]

Valleroy

[11] Patent Number: 5,725,182
[45] Date of Patent: Mar. 10, 1998

[54] TURBO FAN ENGINE THRUST REVERSER

[75] Inventor: Laurent Georges Valleroy, Le Havre, France

[73] Assignee: Societe Hispano Suiza, Colombes Cedex, France

[21] Appl. No.: 603,448

[22] Filed: Feb. 20, 1996

[30] Foreign Application Priority Data

Feb. 21, 1995 [FR] France ................... 95 01959

[51] Int. Cl.$^6$ .................. B64C 15/02; F02K 3/06
[52] U.S. Cl. .................. 244/110 B; 239/265.29; 239/265.31; 60/226.2
[58] Field of Search ............ 244/110 B; 239/265.25, 239/265.27, 265.29, 265.31; 60/226.2

[56] References Cited

U.S. PATENT DOCUMENTS

| | | | |
|---|---|---|---|
| 3,280,562 | 10/1966 | Theits et al. | |
| 3,699,682 | 10/1972 | Kleckner | 60/226.2 |
| 3,875,742 | 4/1975 | McMurtry et al. | 239/265.31 X |
| 4,407,120 | 10/1983 | Timms | 239/265.31 X |
| 4,410,152 | 10/1983 | Kennedy et al. | 244/110 B |
| 4,485,970 | 12/1984 | Fournier et al. | 239/265.29 |
| 4,716,724 | 1/1988 | Newton | 239/265.31 X |
| 4,801,112 | 1/1989 | Fournier et al. | 244/110 B |
| 4,865,256 | 9/1989 | Durand et al. | 239/265.29 |
| 4,930,307 | 6/1990 | Newton | 239/265.31 X |
| 5,054,285 | 10/1991 | Geidel et al. | 244/110 B X |
| 5,090,197 | 2/1992 | Dubois | 60/226.2 |
| 5,120,004 | 6/1992 | Matthias | 244/110 B |
| 5,197,693 | 3/1993 | Remlaoui | 244/110 B |

FOREIGN PATENT DOCUMENTS

| | | |
|---|---|---|
| 0 043 764 | 1/1982 | European Pat. Off. . |
| 0 067 747 | 12/1982 | European Pat. Off. . |
| 0 191 204 | 8/1986 | European Pat. Off. . |
| 2 622 928 | 5/1989 | France . |

*Primary Examiner*—William Grant
*Attorney, Agent, or Firm*—Bacon & Thomas

[57] ABSTRACT

A thrust reverser for a turbofan-type turbojet engine is disclosed having an inner housing with a rear, downstream edge, a fan cowling extending around a portion of the inner housing so as to define a bypass gas flow duct, the fan cowling having a rear edge portion disposed forwardly of the rear edge of the housing. The thrust reverser also includes a thrust reverser flap assembly having a carriage slidably connected to the rear edge portion of the fan cowling so as to move in an axial direction between first and second positions, a thrust reverser flap having a rear flap edge disposed forwardly of the rear edge of the inner housing and pivotally attached to the carriage, and a link rod pivotally connected to the thrust reverser flap and to a stationary structure such as the inner housing. When the carriage is in its first position, the thrust reverser flap is in a forward thrust position wherein an outer surface of the thrust reverser flap is flush with the outer surface of the fan cowling and, when the carriage is in its second position, the thrust reverser flap is in a reverse thrust position wherein it redirects the gases passing through the bypass duct in a reverse thrust direction.

5 Claims, 3 Drawing Sheets

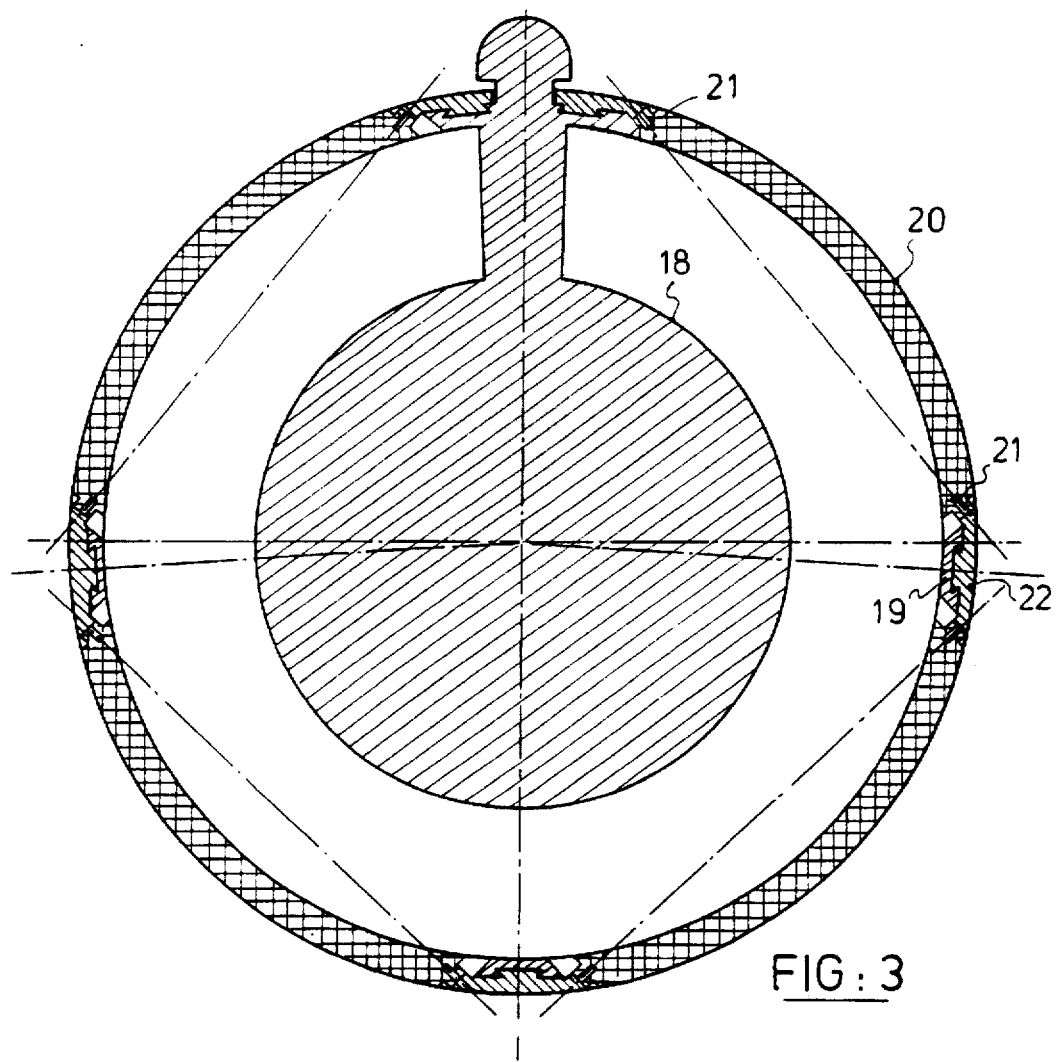
FIG: 3
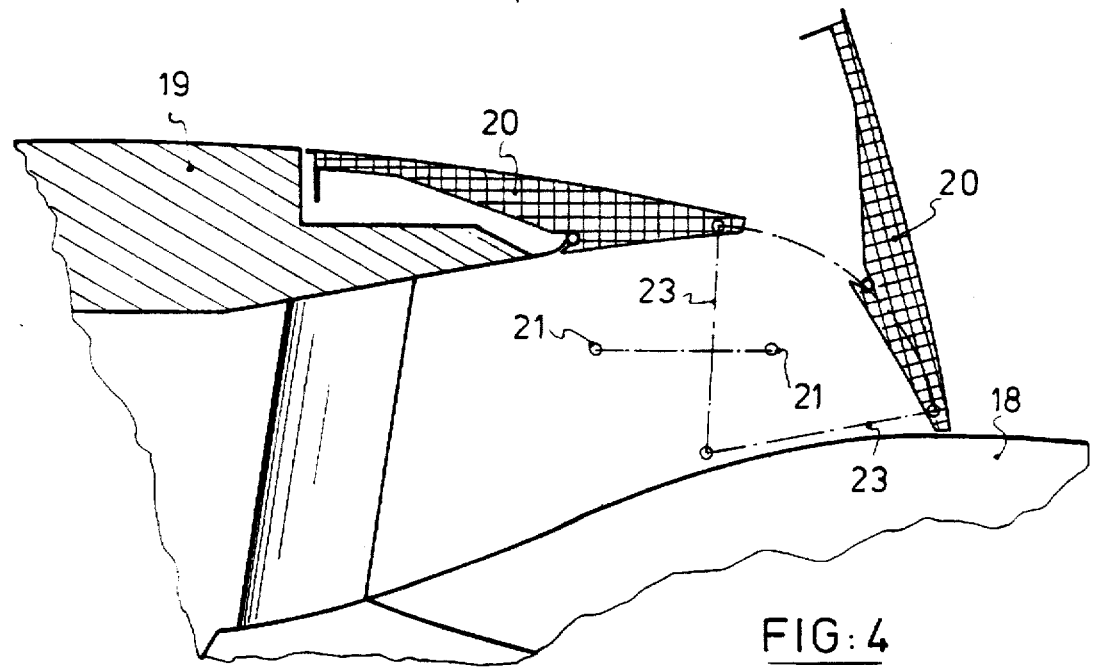
FIG: 4

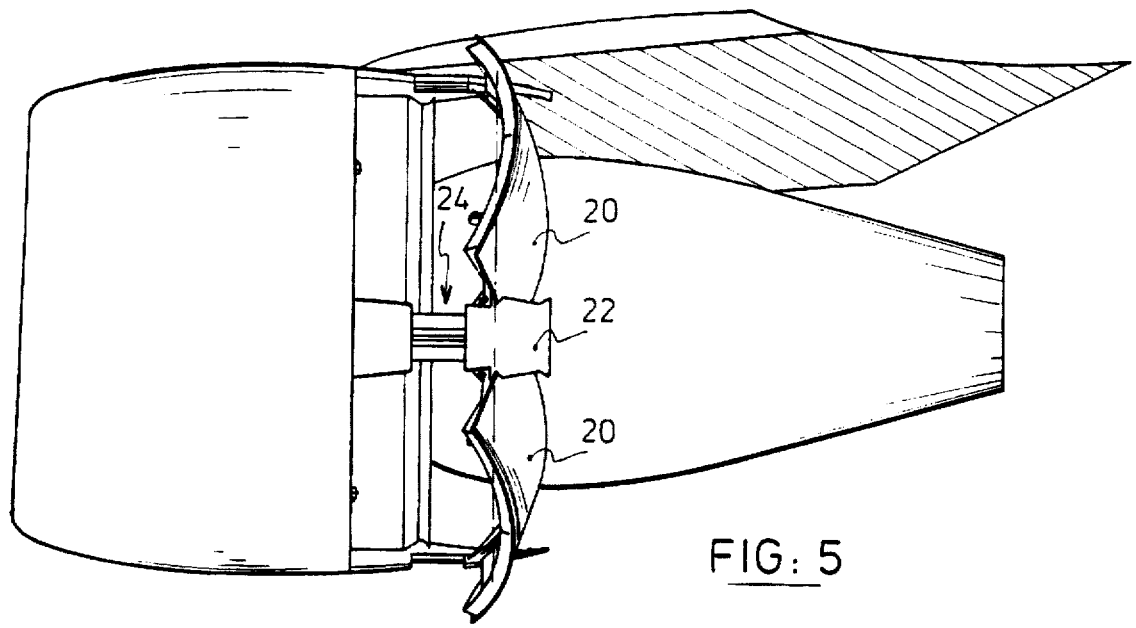
FIG: 5
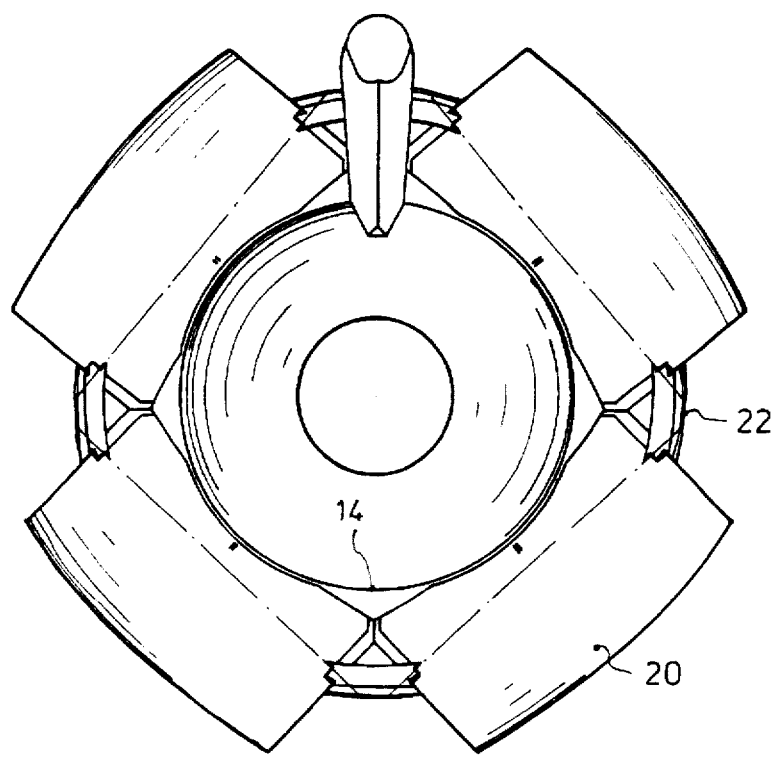
FIG: 6

TURBO FAN ENGINE THRUST REVERSER

BACKGROUND OF THE INVENTION

The present invention relates to a thrust reverser for a turbo fan-type turbo jet engine, more particularly such a thrust reverser associated with a rear portion of a fan cowling in which the thrust reverser flaps are located forwardly of the engine exhaust opening.

French Patent 2 622 928 discloses a thrust reverser having one or more thrust reverser flaps located in a rearward, or a downstream, position and which generate a reverse thrust by redirecting the bypass air of a fan type, turbojet engine. In this thrust reverser, doors or flaps, in addition to reversing either the bypass airflow, or the bypass airflow and the jet exhaust gases, also constitute the exhaust nozzle when the flaps or doors are in their forward thrust positions. Consequently, the downstream, or rearward, edges of the doors or flaps will also constitute the downstream, or rearward, end of the cowling defining the outer wall of the bypass airflow duct. Typically, this duct assumes an annular configuration for the bypass airflow. In known reversers of this kind, the doors or flaps are pivotally affixed to the stationary structure of the thrust reverser.

FIG. 1 discloses a known thrust reverser which comprises a stationary upstream, or forward, structure 1 affixed to the turbojet engine 2, or to the engine cowling, having an inner wall 3 forming a radially outer boundary of the annular gas flow duct 4 and an outer wall 5 connected to the inner wall 3, wherein the outer wall 5 has two longitudinal extensions 6 located on either side of the engine structure. The thrust reverser flaps 7a and 7b are pivotally attached to the side structures 6 by pivots 8. The side extensions 6 may also support an actuating system (which may be comprised of hydraulic jacks, or the like) and devices for locking the flaps 7a and 7b. The rear, or downstream, ends 9 of the flaps 7a and 7b constitute the rear, or trailing, edge of the outer wall 5.

The known thrust reverser assemblies as described above, are incompatible with the newer, high bypass ratio turbofan engine which have a shortened fan cowling e.g., a fan cowling that has an axial length significantly less than the axial length of an inner housing enclosing the jet engine. In these engines, the downstream, or rear, edge of the shortened fan cowling is located forwardly of the rearmost edge of the inner housing which typically constitutes the jet engine exhaust opening. In such cases, the thrust reverser flaps redirect only the bypass gas flow to generate the thrust reversing force and such thrust reversers must be attached to the rearmost edge portion of the shortened fan cowling.

SUMMARY OF THE INVENTION

A thrust reverser for a turbofan-type turbojet engine is disclosed having an inner housing with a rear, downstream edge, a fan cowling extending around a portion of the inner housing so as to define a bypass gas flow duct, the fan cowling having a rear edge portion disposed forwardly of the rear edge of the housing. The thrust reverser also includes a thrust reverser flap assembly having a carriage slidably connected to the rear edge portion of the fan cowling so as to move in an axial direction between first and second positions, a thrust reverser flap having a rear flap edge disposed forwardly of the rear edge of the inner housing and pivotally attached to the carriage, and a link rod pivotally connected to the thrust reverser flap and to a stationary structure such as the inner housing. When the carriage is in its first position, the thrust reverser flap is in a forward thrust position wherein an outer surface of the thrust reverser flap is flush with the outer surface of the fan cowling and, when the carriage is in its second position, the thrust reverser flap is in a reverse thrust position wherein it redirects the gases passing through the bypass duct in a reverse thrust direction.

The link rod is pivotally connected to the thrust reverser flap rearwardly of its pivot connection to the carriage. The carriage is attached to the fan housing by a guide to facilitate the axial, longitudinal movement of the carriage relative to the fan housing. Movement of the carriage from its first, forward position, to its second, rearward position moves the thrust reverser flap from its forward thrust position to its reverse thrust position. The carriage slides in an axial direction substantially parallel to the longitudinal axis of the turbojet engine.

BRIEF DESCRIPTION OF THE DRAWINGS

FIG. 3 is a transverse, cross-sectional view of the thrust reverser of FIG. 2 in a plane extending through the axes of the thrust reverser flap pivots.

FIG. 4 is a partial, cross-sectional view of the thrust reverser according to the present invention illustrating a thrust reverser flap in its forward and reverse thrust positions.

FIG. 5 is a side view, similar to FIG. 2, illustrating the thrust reverser doors in their reverse thrust positions.

FIG. 6 is a rear view of the thrust reverser illustrated in FIG. 5.

DETAILED DESCRIPTION OF THE PREFERRED EMBODIMENT

Figure 1:
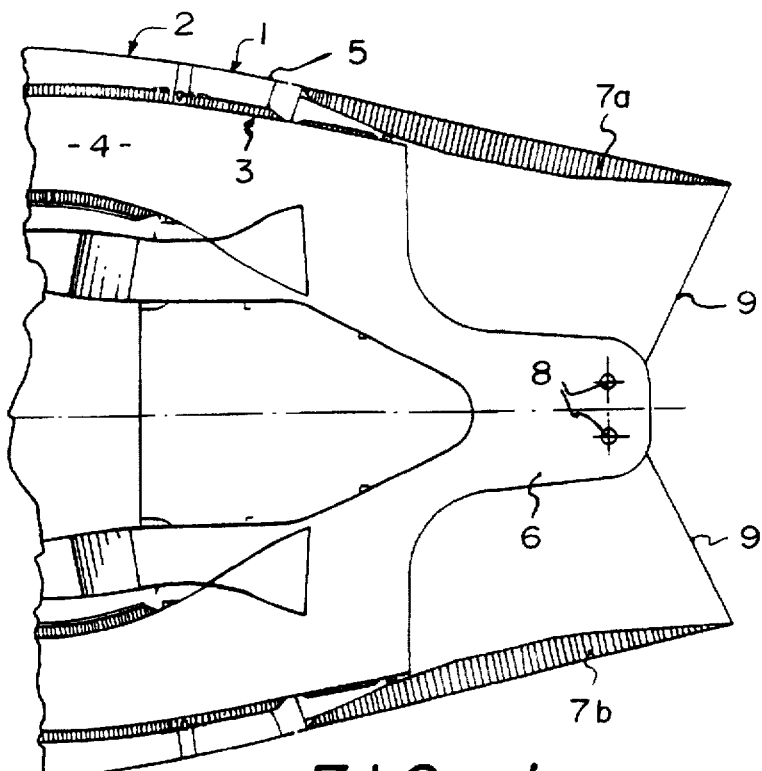
FIG. 1 is a partial, longitudinal, cross-sectional view of a known thrust reverser.
Figure 2:
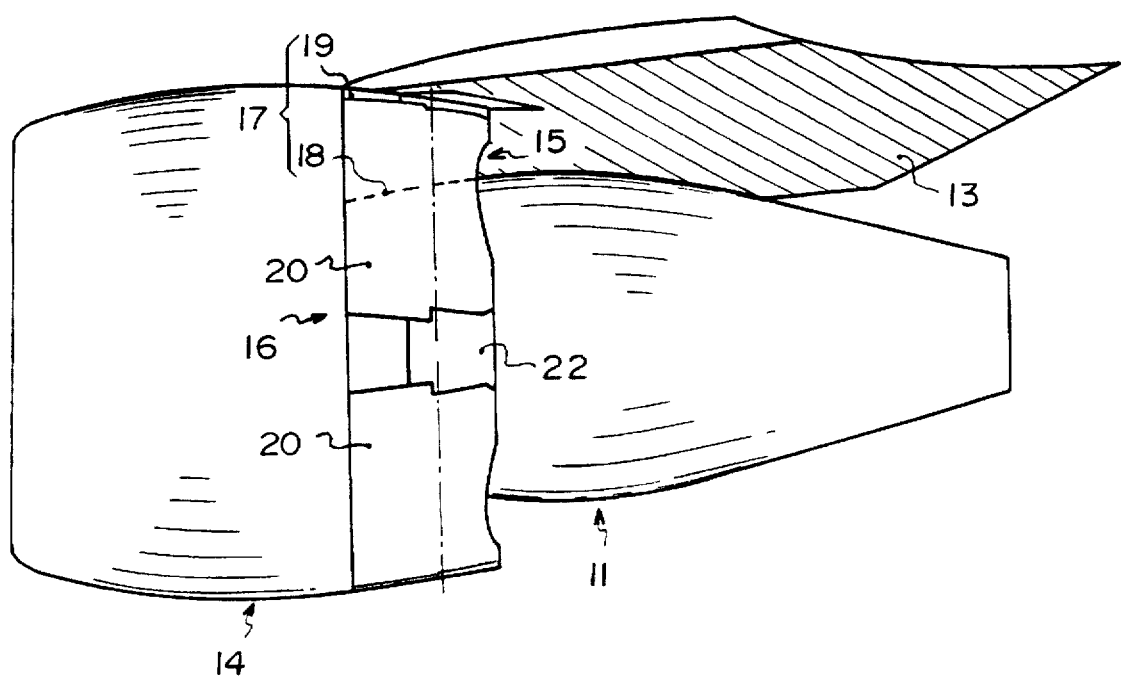
FIG. 2 is a side view of a turbofan engine incorporating a thrust reverser according to the present invention with the thrust reverser flaps in their forward thrust positions.

FIG. 2 illustrates a thrust reverser according to the present invention associated with a high bypass turbofan-type turbojet engine 11. As illustrated, the turbojet engine 11 is mounted on pylon 13 which extends downwardly and forwardly from an aircraft wing (not shown). Integrated cowling 14 encloses the fan and forms, with the housing of the turbojet engine 11, a generally annular bypass flow duct 15 through which circulates cold, or bypass gas flow generated by the fan. As can be seen, the cowling 14 is axially significantly shorter than the axial length of the housing for the turbojet engine 11 which has a rear portion, forming the exhaust duct for the jet engine located rearwardly of the rear edge portion of the fan cowling 14.

According to the present invention, a thrust reverser 16 is incorporated into the downstream edge portion of the cowling 14. The thrust reverser 16 comprises a stationary structure 17 having a radially inner housing portion 18 and a radially outer cowl portion 19, which forms the downstream edge portion of the cowling 14. The movable portion of the thrust reverser 16 comprises a plurality of thrust reverser flaps 20. Although the invention is illustrated and described utilizing four such flaps, it is to be understood that more or less than this number may be utilized without exceeding the scope of this invention.

The thrust reverser is illustrated in greater detail in FIGS. 3-5. Each thrust reverser flap 20 is pivotally attached to two lateral pivots 21 located on each lateral side of each thrust reverser flap. The pivots 21 pivotally attach the thrust reverser flaps 20 to carriages 22 which are attached to the fan cowling so as to translate in a generally axial direction, substantially parallel to the longitudinal axis of the engine. The carriages 22 are connected to the stationary structure 19 of the fan cowling 14 by guide means 24 which are rigidly affixed to the stationary outer structure 19. A link rod 23 also connects each of the thrust reverser flaps 20 to the stationary inner housing. Link rod 23 is pivotally attached to the stationary inner housing and to the thrust reverser flap 20 at a location rearwardly, or downstream, of the pivots 21.

A known system for moving the thrust reverser flaps 20 between their forward thrust positions, illustrated in FIG. 2 and FIG. 4, and their reverse thrust positions, illustrated in FIGS. 4–6, may be utilized, such as hydraulic jacks, or the like, and may be connected to either the flaps, or the movable carriages and to the stationary structure. Such systems are well known in the art and it is not believed that any detailed description need to be provided here. Suffice to say that any known system can be utilized with the present invention.

When the thrust reverser flaps 20 are in their forward thrust positions as illustrated in FIGS. 2 and 3, and outer surface of each of the thrust reverser flaps 20 is substantially flush with the outer surface of the fan cowling 14 such that the flaps 20 form an integral portion of the fan cowling 14. The flaps are held in their closed, forward thrust positions by the carriage 22, the pivots 21 and the link rod 23.

When passing into the reverse thrust positions, illustrated in FIGS. 5 and 6, each thrust reverser flap 20 pivots about the pivot attachments 21, while the link rod 23 pivots about its hinge connection on the stationary, inner housing structure 18 while the carriages 22 move in a rearward direction. When the thrust reverse position is reached, each thrust reverser flap 20 again is held in position by the carriage 22, pivots 21 and the rear link rod 23. In known fashion, in the reverse thrust positions, the flaps 20 will redirect the gases passing through the bypass duct 15 in a direction so as to provide a reverse thrust.

The thrust reverser flaps 20 each pivot about an axis passing through the pivots 21, the plane of these axes extending substantially perpendicular to the longitudinal axis of the engine.

When the thrust reverser is in its forward thrust mode, the pressures exerted on the thrust reverser flaps 20 are mainly exerted in the vicinity of the pivots 21 or the link rods 23 thereby allowing the control system to remain substantially idle. During forward thrust operation, the outer wall of the bypass duct has an uninterrupted aerodynamic contour, being totally free of any cavities in the vicinity of the junction between the upstream, or forward edge of the thrust reverser flaps 20 and the outer surface of the stationary structure 19 and the fan cowl 14. The structure 19 comprises a rounded deflection edge thereby improving efficiency.

The thrust reverser according to the present invention is capable of being installed in a compact space, of particular importance in a shortened fan cowling of modern high bypass ratio turbofan engines. The positions of the pivots 21 and the attachment pivots of the link rods 23 onto the thrust reverser flaps 20 may be determined such that, in the forward thrust mode, the pressure exerted by the gas flowing through duct 15 on the thrust reverser flaps 20 exerts an axial component in a forward direction thereby assisting thrust reverser flap 20 to be held in a stable position.

The foregoing description is provided for illustrative purposes only and should not be construed as in any way limiting this invention. The scope of which is defined solely by the appended claims.

I claim:

1. A thrust reverser for a turbofan jet engine comprising:
   a) an inner housing having a rear edge;
   b) a fan cowling extending around a portion of the inner housing along a central axis so as to define therebetween a bypass duct, the fan cowling having a rear edge portion disposed forwardly of the rear edge of the housing; and,
   c) at least one thrust reverser flap assembly comprising:
      i) a plurality of individual guides attached to the fan cowling and extending rearwardly of the rear edge portion of the fan cowling;
      ii) a plurality of carriages, each carriage slidably connected to one of the plurality of guides so as to move relative to the fan cowling in a direction generally parallel to the central axis between first and second positions;
      iii) a thrust reverser flap having a rear flap edge disposed forwardly of the rear edge of the inner housing and pivotally attached to two of the plurality of carriages; and
      iv) a linkrod pivotally connected to the thrust reverser flap and to the inner housing such that, when the carriages are in the first position the thrust reverser flap is in a forward thrust position whereby an outer surface of the thrust reverser flap is substantially flush with an outer surface of the fan cowling, and when the carriages are in the second position, the thrust reverser flap is in a reverse thrust position redirecting gases passing through the bypass dust in a reverse thrust direction.

2. The thrust reverser of claim 1 wherein the thrust reverser flap is attached to the carriages so as to pivot about a pivot axis extending generally perpendicular to the central axis.

3. The thrust reverser of claim 1 further comprising a plurality of thrust reverser flap assemblies.

4. The thrust reverser of claim 3 wherein each carriage is pivotally attached to two thrust reverser flaps.

5. The thrust reverser of claim 1 wherein the linkrod is connected to the thrust reverser flap rearwardly of the pivot attachment of the thrust reverser flap and the carriages.

* * * * *